United States Patent [19]

Boetto et al.

[11] 4,030,551
[45] June 21, 1977

[54] FOLDING FLEX TOOLBAR

[75] Inventors: Charles Boetto, Naperville; Wayne L. Orkwiszewski, Romeoville; Donald E. Connor, Plainfield, all of Ill.

[73] Assignee: International Harvester Company, Chicago, Ill.

[22] Filed: Apr. 12, 1976

[21] Appl. No.: 676,090

[52] U.S. Cl. .............................. 172/126; 172/456; 280/411 R; 172/311; 91/170 R
[51] Int. Cl.² ................... A01B 15/14; A01B 73/00
[58] Field of Search .......... 172/311, 456, 491, 128, 172/130, 126; 280/411 A, 411 C, 411 R; 16/135, 137, 147; 91/170 R; 92/140; 74/99 R, 516; 298/22 D, 35 M

[56] References Cited
UNITED STATES PATENTS

| | | | |
|---|---|---|---|
| 1,805,588 | 5/1931 | Manley | 92/140 |
| 2,596,471 | 5/1952 | Densmore | 172/491 X |
| 3,018,762 | 1/1962 | Korb | 91/170 |
| 3,554,295 | 1/1971 | Kopaska | 172/456 |
| 3,774,693 | 11/1973 | Orthman | 172/311 |
| 3,913,448 | 10/1975 | Priestly | 91/180 |
| 3,941,194 | 3/1976 | Orthman | 172/456 |

*Primary Examiner*—Richard J. Johnson
*Attorney, Agent, or Firm*—F. David AuBuchon; Floyd B. Harman

[57] ABSTRACT

A folding tool bar for agricultural implements and including a central section and outboard wing sections hingedly connected thereto for movement between extended operative lowered positions where they may follow rolling ground conditions and folded over-center raised positions to reduce transport width. Each wing section is actuated by a two-stage hydraulic cylinder on the central section which cooperates with a crank arm on such wing section during its first stage to apply torque to the crank arm through the medium of a draw link by a pulling action in tension, assisted by a powerful camming action, the two forces serving to raise the wing so that it barely clears the ground at a small angle on the order of 5°, thereby enabling the implement to perform a turnabout motion with the tools withdrawn from the ground but with the wing remaining unfolded. An abutment within the cylinder positively terminates the first stage of operation and determines the 5° elevation of the wing so that the wing section is thus positively and firmly supported during the turnabout operation and thereafter, if desired, the first stage of cylinder operation may be discontinued to restore the wing to its ground-engaging position for working the next crop row. However, if over-center wing folding operations for transport purposes are desired, the second stage of each cylinder is employed. Conventional hydraulically operatedmarkers at the outer ends of the wings, and also hydraulically operable assist wheels which are carried by the main tool bar section are caused to become effective at appropriate times under the control of novel hydraulic circuitry.

13 Claims, 7 Drawing Figures

FOLDING FLEX TOOLBAR

The present invention relates generally to agricultural implements of the type having folding tool bars including a central horizontal main section and outboard wing sections hingedly connected thereto for swinging movement between extended operative lowered earth-working positions where they may follow rolling ground conditions and folded over-center raised positions which appreciably reduce the overall width of the implement. A folding tool bar of the general type under consideration is shown and described in U.S. Pat. No. 3,774,693 and in a copending United States patent application, Ser. No. 649,931 filed on Jan. 19, 1976 and entitled FOLDING TOOL BAR FOR AGRICULTURAL IMPLEMENTS.

Briefly, the tool bar of the aforementioned copending application, Ser. No. 649,931 embodies a hollow central main section and oppositely extending wing sections hingedly connected thereto for swinging movement between lowered extended operatively ground working positions and raised over-center parked positions for reduced transport width of the implement to which the tool bar is applied. An actuating mechanism for each wing section embodies an hydraulic cylinder within the main tool bar section and having a plunger operatively connected to a crank arm on the adjacent wing section by means of a draw link which functions initially as the plunger is extended to engage an abutment on the crank arm and transmit torque to the latter so as to raise the wing section from its operative position by a powerful lever action, and which subsequently functions, as the plunger continues to move away from the abutment, to act in tension and transmit the necessary crank arm torque to raise the wing section to its over-center parked position. The character of such actuating mechanism is such that substantially the maximum moment of force of which the mechanism is capable is applied to the crank arm at the critical time when it is most needed to raise the wing section from its operative horizontal position through the first several degrees of lift. Shortly after the wing section and its associated tools have been lifted from the ground and the critical need for a powerful lift is no longer necessary and, as the plunger continues to be extended, the powerful leverage action of the draw link is discontinued and the latter functions solely in tension to exert a pulling tension on the draw link to bring it to its fully raised over-center position.

This same general arrangement is preserved in the folding tool bar of the present invention but the improvement which is predicated thereon resides in the use of novel two-stage hydraulic cylinder and plunger arrangements as well as in a means whereby each cylinder is employed in its first stage of operation to effect a small partial projection of the plunger and attain the initial raising of the wing section away from the ground through a small angle which leaves the wing elevated at approximately a 5° angle. Such first stage of cylinder operation involving the aforementioned powerful leverage lifting action which is more than adequate to maintain the wing section thus extended so that implement turnabout operations at the end of a planting or other earth-working row may be effected without guesswork such as raising of the wing section or folding thereof beyond a point which is merely adequate to afford the necessary ground clearance. The two-stage cylinder is so designed that at the completion of the first stage a positive stop abutment within the cylinder maintains the wing section at its desired 5° angular elevation. After turnabout operations have been completed, the first stage of cylinder operation may be disabled and the wing thus restored to its fully lowered ground-engaging position and the next row operating may proceed.

The second stage of cylinder operating is resorted to when over-center folding of the wing is desired so as to reduce the transport width. The second stage of the cylinder is used either to further project the plunger subsequent to the small partial projection effected by the first stage or to effect the full projection of the plunger without using the first stage of the cylinder.

As will become readily apparent when the nature of the invention is better understood, first stage cylinder operation is effected largely under the control of a first and floating piston which is associated with the cylinder, while second stage cylinder operation is effected entirely under the control of a second piston on which the plunger is mounted. The aforementioned abutment within the cylinder limits the stroke of the first floating piston to attain the desired 5° ground clearance position of the wing.

The replacement of the formerly employed single stage actuating cylinders of the previously mentioned application, Ser. No. 649,931 by the above briefly outlined two-stage actuating cylinders constitutes the principal feature of the present invention.

For environmental purposes, the present folding tool bar has been disclosed and described herein in association with an agricultural implement which, for purposes of discussion may be regarded as a seed-planting implement although a wide variety of other earth-working tools such as cultivator middlebusters or tillage devices may be associated with the tool bar if desired. Conventional hydraulically operable folding marker assemblies are disclosed as being operatively installed at the outer or distal ends of the folding wing sections, and also conventional hyraulically operable assist wheels are disclosed as being mounted on the central tool bar section. Also, novel hydraulic control circuitry whereby such instrumentalities may conveniently be operated is shown and described herein and subsequently claimed.

The provision of a folding tool bar such as has briefly been outlined above, and possessing the stated advantages, together with the aforementioned tool bar adjuncts, constitutes the principal object of the present invention. Numerous other objects and advantages of the invention, not at this time enumerated, will readily suggest themselves as the following description ensues.

BRIEF DESCRIPTION OF THE DRAWINGS

In the accompanying three sheets of drawings forming a part of this specification, one illustrative embodiment of the invention has been shown.

FIG. 5 is a sectional view taken substantially on the line 5—5 of FIG. 4;

FIG. 6 is an enlarged sectional view, partly in elevation, taken substantially centrally and longitudinally through one of the two-stage hinge-actuating cylinders which comprises one of the principal features of the present invention; and FIG. 7 is a hydraulic circuit diagram illustrating the operation of the multi-position folding tool bar, as well as of certain other hydraulically operated adjuncts associated with the farm implement of FIG. 1.

Figure 1:
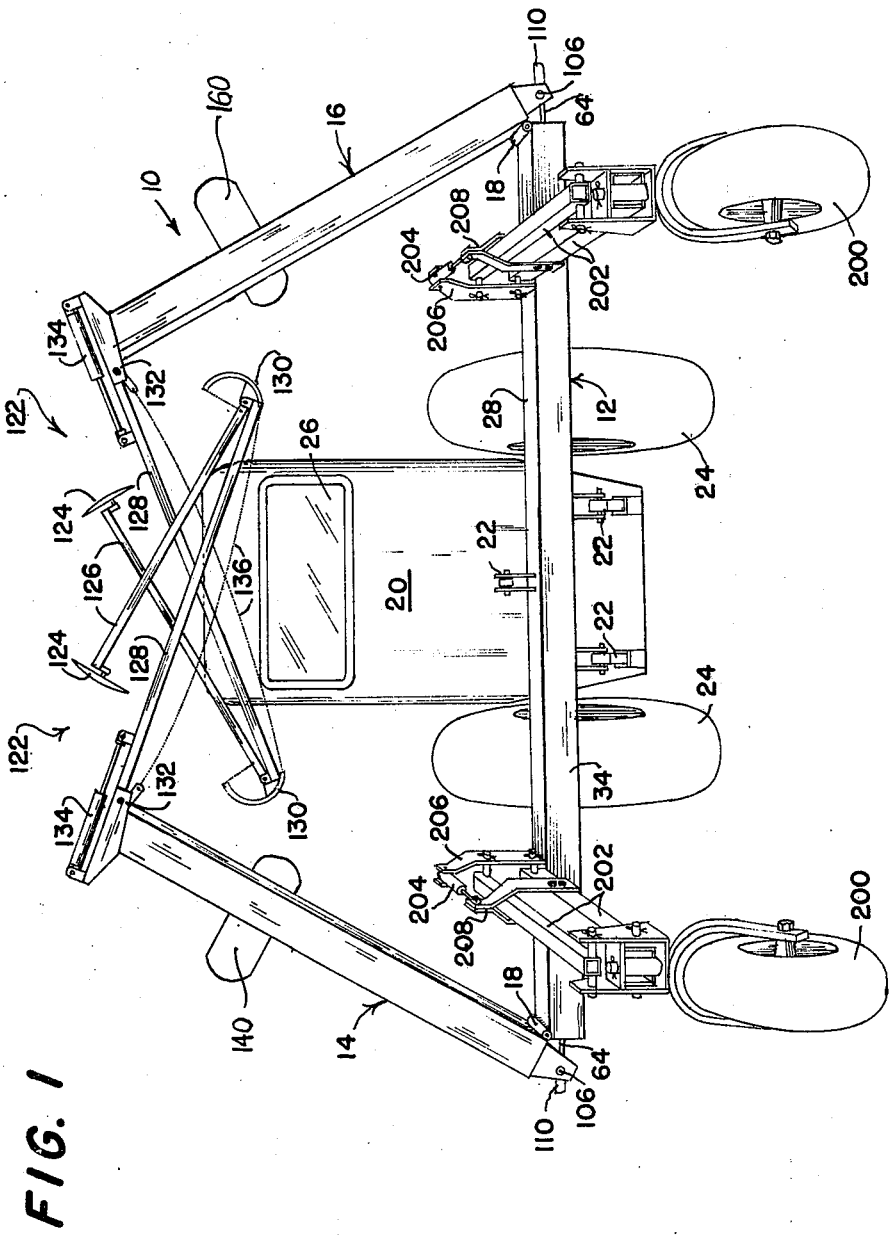
FIG. 1 is a rear elevational view, largely schematic in its representation, of a farm implement embodying the improved multi-position folding tool bar of the present invention and showing the same in its freely extended position.

Referring now to the drawings in detail and in particular to FIG. 1, the novel multi-position folding tool bar of the present invention has been designated in its entirety by the reference numeral 10, and is of the general type shown and described in the aforementioned copending application of Gerald G. Ward, Ser. No. 649,931, filed on Jan. 19, 1976 and entitled FOLDING TOOL BAR FOR AGRICULTURAL IMPLEMENTS. Tool bars of this general character, insofar as their folding aspects are concerned, and when operatively associated with a relatively wide agricultural implement, are advantageously folded for decreasing their width for passage through farm gates and other narrow spaces, as well as for road transport. Such tool bars are provided with hinges to facilitate the folding operation.

The particular agricultural implement with which the folding tool bar 10 is associated is dependent upon the character of the tools which are supported by the tool bar, no specific tools being disclosed herein but it will be understood that a wide variety of tools such as cultivator shanks or disks, middlebusters, spring harrow teeth, seed dispensing and planting instrumentalities, sub-soil shovels and other tools too numerous to mention may be associated with the tool bar. Irrespective, however, of the particular tool assemblies which may be associated with the tool bar 10, the essential features of the invention remain substantially the same.

Figure 4:
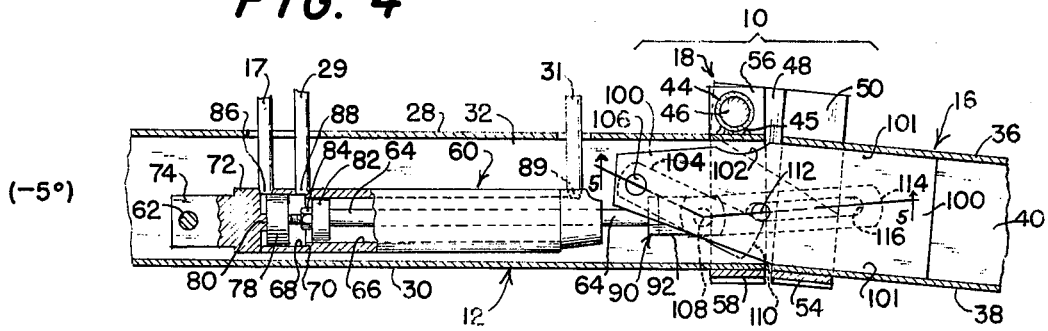
FIG. 4 is a sectional view similar to FIG. 3, showing the two-stage hinge-actuating cylinder in its fully retracted position prior to commencement of the first stage so as to free or release the adjacent wing section for ground working operation.

The tool bar 10 of the present invention is made in three sections, namely a main central inner tool bar section 12, and a pair of outer or outboard wing sections 14 and 16 having ground engaging gauge wheels 140 and 160 respectively. The wing sections 14 and 16 are hingedly connected to the opposite ends of the main central inner tool bar section 12 by means of offset hinge joints 18 for swinging movement between the fully lowered ground engaging or earth-working position which is illustrated in FIG. 4 and the fully raised or folded parked or over-center position which is illustrated in FIG. 1. As will be described in greater detail subsequently, the principal feature of the present invention resides in a means whereby the wing sections 14 and 16 are capable of being raised from their lowermost ground-engaging positions and positively retained in such raised position so that they assume an approximate 5° angular position above the horizontal axis of the central tool bar section 12 for ground clearance purposes, as for example when the implement is making a sharp turn or reversing its direction of travel in the field.

The central inner tool bar section 12 is adapted to be fixedly mounted on the rear end of a tractor-like implement chassis 20 by means of suitable hitch connections 22, the chassis embodying the usual driving wheels 24 and an operator's cab 26. Fur purposes of discussion herein, the folding tool bar 10 and the tractor-like chassis 20 by means of which it is motivated may be regarded as the complete agricultural implement framework to which various tools and other motivating and extraneous auxiliary adjuncts are applied to complete the implement and render the same operable.

Figure 2:
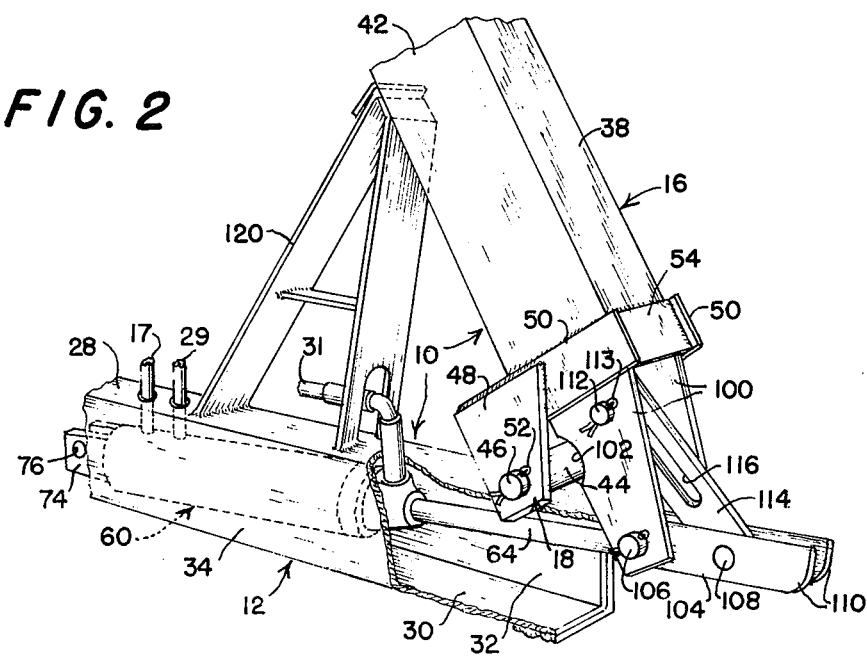
FIG. 2 is an enlarged fragmentary detail perspective view of a limited portion of the multi-position folding tool bar of FIG. 1, the view being taken in the vicinity of one of the hinge joints thereof with a portion of the central or main tool bar section broken away in the interest of clarity, and the adjacent tool bar extension or wing being shown in its fully folded raised over-center inoperative position of transport.
Figure 3:
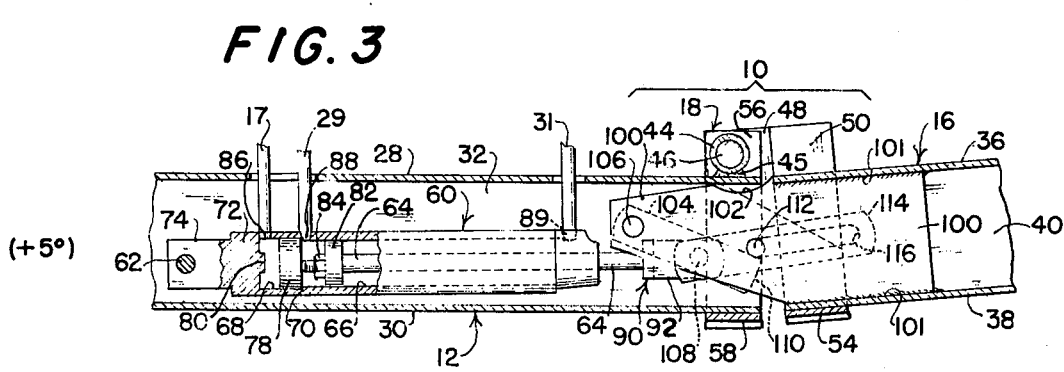
FIG. 3 is a fragmentary longitudinal sectional view of the folding tool bar taken in the vicinity of one of the hinge joints, showing the two-stage hinge-actuating cylinder and its associated linkage mechanism largely in elevation, and with the cylinder at the completion of its first stage of operation so as to maintain the adjacent wing section partially elevated.

Referring now additionally to FIGS. 2, 3 and 4, the fixed central main tool bar section 12 is of hollow tubular construction and is preferably, but not necessarily, rectangular in transverse cross section, thus providing top and bottom walls 28 and 30 and front and rear side walls 32 and 34. The two wing sections 14 and 16 are substantially identical and therefore a description of one of them will suffice for them both. These wing sections are likewise of hollow rectangular tubular construction and have transverse dimensions conforming to those of the main tool bar section 12, thus presenting top and bottom walls 36 and 38 and front and rear side walls 40 and 42. In the interest of brevity, the main central tool bar section 12 will hereinafter be referred to simply as the tool bar, while the outer or end tool bar sections 14 and 16 will be referred to simply as the wings.

With continued reference to FIGS. 2, 3 and 4, the offset hinge joint 18 between the tool bar 12 and the wing 16 is established by the provision of a hinge sleeve 44 which is secured by a weldment 45 to the top wall 28 of the fixed tool bar 12. A hinge pin or shaft 46 projects through the hinge sleeve 44 so as to provide trunnion-like ends which receive thereover a pair of side plates 48 which are welded to reinforcing plates 50 which, in turn, are welded to the side walls 40 and 42 of the wing 16 at the extreme proximate or inner ends thereof. Lock pins 52 (FIG. 2) hold the hinge pin 46 in position and a reinforcing plate 54 extends across the bottom wall 38 of the wing 16 between the reinforcing plates 50. The side plates 48 are so dimensioned that they provide the necessary offset for the hinge joint 18 in order that when the wing and tool bar are in their fully lowered or ground engaging, earth-working position as shown in FIG. 4, the adjacent ends of the tool bar and wing mate with each other in abutting relationship. Side and bottom plates 56 and 58, similar to the side and bottom reinforcing plates 50 and 54 are provided on the adjacent outer end region of the fixed tool bar 14. It should be noted that in FIG. 4 the wing 16 is shown at an angle of approximately 5° below horizontal and the wing is in mechanical contact with the main frame 12 thus preventing further relative movement of the wings downwardly. During operation the wings 14 and 16 are supported by gauge wheels 140 and 160 (see FIG. 1) and are free to float upwardly from their lowermost position about pivot shafts 46. During operation hydraulic cylinders 60 permit this floating action. In FIG. 3 wing 16 is shown at an angle of approximately 5° above horizontal which is the position the wings assume in response to actuation of the first stage of hydraulic cylinders 60. At this position gauge wheels 140 and 160 are normally no longer in ground contact. If, however, an unusual high spot is encountered by gauge wheels 140 or 160 the wings 14 and 16 are free to float upwardly about pivot shafts 46.

Hydraulic means are provided for raising or lowering the wings 14 and 16 between their ground engaging position and their fully raised over-center folded position as shown in FIG. 1, such means being identical on both sides and operable by hydraulic control means as will be described in detail subsequently. Each such hydraulic means embodies in its general organization a two-stage hydraulic cylinder 60 which is capable during its first stage of operation to raise its associated wing 14 or 16, as the case may be, from its ground-engaging position to a slightly inclined position such as has been shown in FIG. 3 in order that whatever earth-working tools which may be associated therewith will be suspended above and out of contact with the ground for implement turnabout purposes, and is capable during its second stage of operation to further raise the wing to its over-center parked position for transport purposes.

Considering the power-actuated movements of the wing 16 and with reference to FIGS. 2, 3 and 4, the cylinder 60 is wholly disposed and therefore concealed within the fixed tool bar 12 and has its inner end pivoted on a pin 62 which extends between the side walls 32 and 34. The cylinder 60 is provided with a plunger 64 which projects outwardly therefrom and is effectively connected to the wing 16 for wing motivation purposes in a manner that will be set forth in detail presently.

Figures 5, 6, 7:
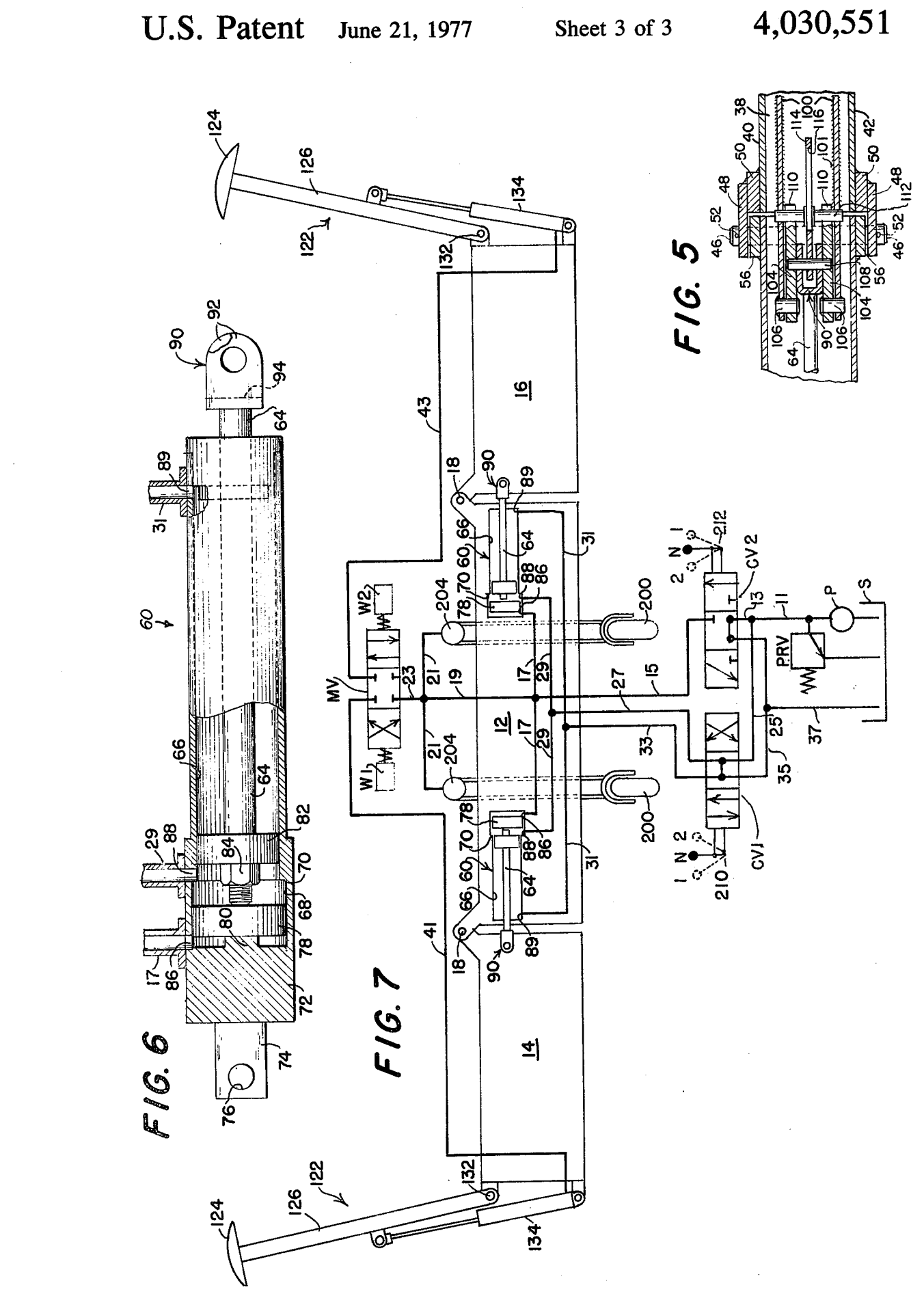

Referring now additionally to FIG. 6 wherein the details of the cylinder 60 are more clearly illustrated, the cylinder is in the form of an elongated tubular body having a relatively long bore 66 and a slightly enlarged and relatively short counterbore 68 at its proximate end, the two bores 66 and 68 establishing at their juncture region an internal annular shoulder 70. The rear or proximate end of the counterbore 68 is closed by means of a closure cap or plug 72 having an ear 74 provided with an opening 76 which receives the aforementioned pivot pin 62.

A floating positive displacement piston 78 is slidably disposed within the counterbore 68 between a forwardly extending boss 80 which is centrally formed on the closure plug 72 and the annular shoulder 70, while a second piston 82 is mounted on the inner or rear end of the plunger 64 and second in position thereon by means of a nut 84. The second piston 82 is thus capable of a relatively long stroke between a position wherein the plunger 64 is substantially fully retracted within the cylinder 60 and a position wherein such plunger is substantially fully projected from the cylinder. On the other hand, the floating piston 78 is capable of only a relatively short positive displacement stroke.

Fluid ports 86 and 88 are provided in the proximate end region of the cylinder 60 and communicate with the counterbore 68. The port 86 communicates with the space between the piston 78 and cylinder plug 72, while the port 88 communicates with the space between the two pistons 78 and 82. Thus, when fluid is admitted to the cylinder 60 through the port 86 to the exclusion of the port 88, the floating piston 78 will be shifted forwardly so that it engages the inner end of the plunger 64 and imparts a short partial stroke to such plunger until such time as the piston 78 engages the annular shoulder 70. Thereafter, when fluid is admitted to the fluid port 88, fluid will be admitted to the cylinder between the two pistons 78 and 82 and the latter piston will be moved forwardly to fully project the plunger 64. A fluid port 89 communicates with the other end of the cylinder 60.

As best shown in FIGS. 3, 4, 5 and 6, the distal end of the plunger 64 carries a yoke 90 having parallel side yoke arms 92 and a connecting bight portion 94, the latter being mounted on the extreme outer end of the piston 64. Such yoke 60 constitutes one element of an articulated linkage mechanism which is effective between the plunger 64 and the wing 16 for wing motivation purposes. This articulated linkage mechanism further embodies a pair of spaced apart flat plate-like crank arms 100 which project into the adjacent open end of the hollow fixed tool bar 12 when the wing is in its lowermost ground engaging position as shown in FIG. 4 and which is withdrawn from such open end when the wing 16 is in its raised over-center position. The two crank arms 100 are secured in edge-to-face relation as by welding 101 to the inside faces of the top and bottom walls 36 and 38 of the wing 16. A clearance notch 102 in the upper end of each crank arm 100 allows the latter to clear the top wall 28 during swinging movement of the wing 16.

The linkage system further includes a combined lever and draw link 104 which is disposed between the two crank arms 100 and which is of the dual link type and consists of parallel link sections which are pivoted to the distal end of the crank arms 100 by rivet-like pivot pins 106. The medial region of the dual draw link 104 is pivoted to the yoke arms by a transverse pin 108. As will become more readily apparent presently, the effective length of the dual draw link 104 is that portion thereof which extends between the axes of the pivot pins 106 and 108, but a forward extension 110 on the draw link 104 projects beyond the pivot pin 108 and underlies a transverse lift pin 112 which extends between the two crank arms 100 and is held in position by lock pins 113 (FIG. 2).

The aforementioned pivot pin 108 which connects the yoke arms 92 on the plunger to the dual draw link 104, also serves to pivotally connect the inner or proximate end of a slotted floating suspension link 114 to the medial region of the yoke arms 92. Such suspension link 114 is formed with an elongated slot 116 therein which receives therethrough the aforementioned lift pin 112. The lift pin 112 functions primarily as a lift abutment which receives the upward thrust of the aforementioned extensions 110 of the dual draw link 108 during the initial lifting phase of the wing 16 and especially during the critical time when the torque requirements are maximum and the tools which are associated with the wing 16 are being lifted from the ground. The lift pin 112 also functions to guide the slotted suspension link 114 into the adjacent end of the hollow central tool bar section 12 during the lowering phase of the wing section 26, all in a manner that will be made clear presently.

Considering now the operation of the herein described folding tool bar assembly 10 only insofar as its folding aspects are concerned, and irrespective of certain other auxilliary tool bar adjuncts which have been disclosed herein in FIGS. 1 and 7 and which will be referred to subsequently, the tool bar assembly per se is quite similar in many respects to that which is shown and described in the aforementioned patent application Ser. No. 649,931, the principal difference between the two structures residing in the use of the two-stage cylinder and plunger arrangements 60, 64 which enables the wing sections 14 and 16 to be raised and fixedly maintained at a 5° elevation as shown in FIG. 3 for ground clearance and turnabout purposes as previously indicated. In the following description of the folding aspects of the present tool bar assembly 10, a relatively brief outline of the movements of the articulated linkage mechanism which exists between the plunger 64 and the wing section 16 will be set forth but a full discussion of the manner in which the wing section 16 is secured in its 5° position of elevation as shown in FIG. 3 will be rendered in detail. For a more complete understanding of the overall folding aspects of the present tool bar assembly 10, reference may be had to such application, Ser. No. 649,931.

The operation of the folding tool bar assembly 10 for wing folding and unfolding purposes takes place under the selective control of the operator in the operator's cab 26 of the agricultural implement which is exemplified by the chassis 20 and its associated tool bar assembly 10. Disregarding at the present time any distinction which is made between the single stage cylinders of the aforementioned application, Ser. No. 649,931 and the two-stage cylinder 90 of the present invention, and assuming for purposes of discussion that the tool bar assembly 10 is in its normal earth-working position so that the earth-working tools carried thereby are in operative relation relative to the ground, initial shifting movement of the plunger 64 to the right as seen in FIG. 4 will bring the combined lever and draw link 104 to a position wherein the forward extension 110 of such link engages, or nearly engages, the lift pin 112 immediately thereabove. It is to be noted at this point that there is a clearance at the proximate end of the slot 116 in the suspension link 114, thus allowing for forward shifting of the link 114 relative to the lift pin 112. Continued forward or outward motion of the plunger and its associated yoke 90 will result in a small angular elevation of the wing 16 incident not only to the placement of a limited region of the draw link 104 under tension, but also due to a further application of torque to the crank arms 100 by reason of a leverage action which takes place as the extension 110 of the draw link 104 engages the lift pin 112 and forces it upwardly and swings it about the axis of the hinge pin 46. Thus, at the time that the wing 16 attains its 5° position as shown in FIG. 3, two different forces are at work in maintaining the wing 16 in such elevated position, namely a degree of tension in the draw link 104 and also a leverage action which is exerted by the extension 110 of the draw link 104 on the lift pin 112. With the use of the two-stage cylinder 90 of the present invention, not only are these two lifting forces initiated under the influence of the motion of the plunger 64, but also they are positively established and maintained by the first stage response of the cylinder 90 as will become clear subsequently. It should be noted that movement of plunger 64 from its position shown in FIG. 4 to its position shown in FIG. 3 can be accomplished by pressurizing either the first or the second stage of cylinder 60.

Further upward movement of the wing 16 beyond its 5° inclination is effected in response to further forward motion of the plunger 64 under the influence of the second stage of cylinder operation. The relative movements of the yoke 90, draw link 104, crank arms 100, and suspension link 114 between the 5° position of inclination shown in FIG. 3 and the over-center position shown in FIG. 1 bear no particular relation to the present invention and, furthermore, they have been fully described in the aforementioned application Ser. No. 649,931 and therefore need not be described in detail herein, suffice it to say that continued forward movement of the plunger 64 allows the lift pin 112 to receive torque-transmitting force from the extension 110 to the draw link 104 until approximately the 30° position of elevation of the wing 16 has been attained. In this 30° position, the clearance notches 102 in the crank arms 100 have allowed these arms to swing outwardly through the open end of the main tool bar section 12 and, at approximately the 50° position of the wing 16, the lift pin 112 moves away from the extension 110 of the draw link as it slides in the slot 116 of the suspension link 114, thus discontinuing the application of frictional torque to the crank arms while the portion of the draw link 104 which exists between the pivot pins 106 and 108 remains effective in tension to continue to pull the crank arms 100 further outwardly from the open adjacent end of the tool bar 12. Eventually, as the plunger 64 continues to become projected, the lift pin 112 encounters the distal end of the slot 116 in the slotted suspension link 114 as indicated in FIG. 2, and the wing 16 comes to rest against an inverted V-shaped pillar or abutment 120 as shown only in FIG. 2, the abutment being suitably mounted on the top wall 28 of the fixed tool bar 12.

It will be understood, of course, that the wing 14 (FIG. 1) and its associated offset hinge assembly 18 function under the control of a dual stage cylinder and plunger assembly 60, 64, reversely positioned within the tool bar 12, in substantially the same manner as the wing 16. The disclosure of FIG. 1 has been stated heretofore as being largely schematic in its representation and, therefore the abutments 120 for limiting the over-center positions of two wings 14 and 16 have not been disclosed in this view, nor have the ground working tools and many other adjuncts which are either necessary or desirable for proper functioning to the agricultural implement. However, with reference to both FIG. 1 and the hydraulic circuit diagram of FIG. 7, a pair of conventional hydraulically operable marker assemblies 122, one for each wing 14 and 16 are provided at the outer end of such wings.

The marker assemblies 122 may be of any well known type, each such assembly as shown in FIG. 1 embodying a marker disk proper 124 which is carried at the outer end of a folding marker arm including an outer arm section 126 and an inner arm section 128, the two sections being connected together by an automatically operable elbow joint 130. The proximate end of the inner arm section 128 is pivoted as indicated at 132 to the extreme outer end of the associated wing 14 or 16, as the case may be, while an extensible and retractible marker cylinder and plunger assembly 134 extends between the end of such wing and a medial region of the associated inner arm 128. When the cylinder and plunger assembly 134 is fully extended as shown in FIG. 1, the inner marker arm section 128 is caused to assume a retracted position which is substantially at a right angle to the associated wing and, when the cylinder and plunger assembly 134 is fully retracted, the inner marker arm section 128 is caused to assume an extended position wherein it is in substantial alignment with the associated wing. As is conventional in connection with such folding marker assemblies, a catenary cable 136 or the like extends between the outer end of the wing and the elbow joint 130 and exerts a pull upon the adjacent end of the outer arm section 126 of the folded marker arm at such time as the catenary cable is drawn taut under the influence of the swinging motion of the inner arm section 128 when the latter is extended by the cylinder and plunger assembly 134. The cable 136 thus unfolds the marker arm for maximum marker offset, all in a manner that is well known in the art. It is to be noted at this point that hydraulic diagram of FIG. 7 is largely schematic in its representation and, therefore, in this view the hydraulic cylinder and plunger assemblies 134 have been shown as being associated with marker assemblies 122 having non-folding marker arms 128 which directly carry marker disks 124 at their outer ends. Non-folding marker assemblies of this type also are well known and are employed where relatively narrow agricultural implements having short folding tool bars are concerned.

The tool bar section 12 is equipped with a pair of assist wheels 200 as shown in FIG. 1. Such assist wheels and the mountings therefor are purely conventional and no claim is made herein to any novelty associated with the same per se although novel hydraulic control means have been shown in FIG. 7 whereby such assist wheels may be selectively actuated in conjunction with other hydraulic control means for supplying fluid to the two-stage cylinders 60 for wing motivating purposes as previously described and for supplying fluid to the cylinder and plunger assemblies 134 for marker operating purposes.

As shown in FIG. 1, the assist wheels 200 are two in number and each wheel is caster-mounted at the rear or outer end of a parallelogram-like frame 202, the angularity of which may be varied in a known manner by means of respective assist wheel-actuating cylinder and plunger assemblies 204 which function between fixed brackets 206 on the tool bar 12 and brackets 208 which are rigidly secured to the lower link of parallelogram-like frame 202. Extension of the assemblies 204 serves to force the assist wheels downwardly and thus raise the earth-working tools associated with the folding tool bar 10 when the latter is in its earth-working position. Conversely, retraction of the assemblies 204 serves to lower the earth-working tools.

Referring now specifically to FIG. 7 wherein wing raising and lowering operations, marker extending and retracting operations and assist wheel operations are schematically illustrated. Such diagram embodies a pair of manually operable directional control valves CV1 and CV2 which, in combination with each other and by selective manipulation thereof, supply hydraulic fluid to the two two-phase cylinders 60 for wing-raising and wing-lowering purposes, and also supply fluid to the assist wheel actuating cylinders 204. The hydraulic circuitry further includes a spring biased solenoid controlled marker value MV which receives hydraulic fluid from the control valve CV2 and distributes the same to the two marker cylinders 134 for selective operation of the marker assemblies 122. A pump P, a pressure relief valve PRV, and the usual sump S constitute additional instrumentalities associated with the circuit diagram.

The directional control valves CV1 and CV2 are three-position valves and such valves are provided with manipulating handles or levers 210 and 212 which are capable of being shifted between a full line central neutral position N and first and second operative dotted line positions which have been labelled 1 and 2.

Assuming that the wing sections 14 and 16 are in their fully lowered ground-engaging positions as shown in FIG. 4 and that it is desired to operate the first phase of cylinders 60 to shift the floating piston 78 (FIG. 6) against the shoulder 70 and raise the wings 14 and 16 to the 5° position shown in FIG. 3. To accomplish this lever 212 of the control valves CV2 is shifted from its neutral position to the No. 2 position thereof. Fluid will then flow from the sump S through pump P, through lines 11, 13, 15 and branch lines 17 to the ports 86, thus shifting the floating pistons 78 against the shoulders 70, and driving the plungers 64 forwardly so as to raise the wings 14 and 16 to their 5° positions of inclination. At the same time, fluid also passes from the line 15 through line 19 and branch lines 21 to the assist wheel cylinders 204 for wheel lowering purposes as previously described. Also at this time fluid will flow from the line 19 through line 23, associated with the marker valve MV.

Second phase operation of the cylinders 60 is attained by shifting the lever 210 of the valve CV1 to its No. 2 position, whereupon fluid will flow from the pump P, through lines 11, 25, 27 and branch lines 29 to the ports 88 of the cylinders 60, thus driving the pistons 82 and plungers 64 outwardly so as to fully raise the wings 14 and 16 as previously described. Fluid will return from the outer ends of the cylinder 60 through return branch lines and lines 31, 33, 35 and 37 back to the sump.

Lowering of the wings 14 and 16 is accomplished by shifting the lever 210 of the valve CV1 to its No. 1 position while leaving the lever 212 of the valve CV2 in its neutral position, whereupon fluid will flow from the pump P, through lines 11, 25, 33 and branch lines 31 to the ports 89.

It has previously been stated that fluid is supplied to the marker cylinder MS through the line 23 at such time as the assist cylinders 204 are supplied with fluid through the branch lines 21. The marker assemblies 122 are selectively operable under the control of a pair of solenoid windings $w1$ and $w2$ associated with the marker valve MV. Raising of the marker arm associated with the wing 14 is effected by energizing the solenoid winding $w1$, whereupon fluid will flow from lines 23 to line 41 to activate the cylinder and plunger assembly 134 of the wing 14. Raising of the marker arm associated with the wing 16 is similarly effected by energizing the solenoid winding $w2$ whereupon fluid will flow from line 23 to line 43 to actuate the other cylinder and plunger assembly 134. It will be understood of course that when neither solenoid winding $w1$ or $w2$ are energized there is no fluid flow either from or to assemblies 134. When it is desired to raise the wings to the 5° elevation of FIG. 3 the solenoid winding of the down marker is energized so that upon movement of lever 212 to its No. 2 position the down marker is raised, the assist wheels are lowered and the wings are elevated to the 5° position.

From the above description, it is believed that the nature and numerous advantages of the present folding tool bar and its associated adjuncts will be readily apparent without further discussion. The invention is not to be limited to the exact arrangement of parts shown in the accompanying drawings or shown in this specification since various changes in the details of construction may be resorted to without departing from the spirit of the invention. Therefore, only insofar as the invention has particularly been pointed out in the accompanying claims is the same to be limited.

What is claimed is:

1. In an articulated sectional tool bar for carrying agricultural earth-working tools, in combination, a normally horizontal main tool bar section and an outer wing section, as offset hinge connecting said sections in end-to-end relationship for swinging movement of the wing section between a normal lowered operative earth-working position where such tools as may be carried thereby may follow a rolling terrain, and a slightly inclined raised inoperative position where such tools are clear of the ground for implement turnabout purposes, a crank arm on said wing section, a hydraulic cylinder pivotally mounted on the main section and having a positive displacement piston therein and a cooperating plunger capable of moving a full stroke projecting therefrom and which is responsive to the stroke of the said positive displacement piston, said cylinder provided with an internal abutment which determines the forward limited motion of the positive displacement piston, said positive displacement piston being effectively engageable with said plunger during forward movement of the former to transmit its limited motion to the plunger to move the plunger a fraction of its full stroke and to raise the wing section to its slightly inclined raised inoperative position, a hydraulic fluid line in communication with said cylinder rearwardly of said positive displacement piston and effective when pressurized to drive said positive displacement piston forwardly, and means effective between the outer end of the plunger and said crank arm for applying torque to the latter to thereby raise said wing section progressively during outward projection of the plunger under the influence of said positive displacement piston.

2. In an articulated sectional tool bar, the combination set forth in claim 1, wherein the effective stroke of said positive displacement piston is such as to impart to the wing section and upward and outward inclination on the order of 5°.

3. In an articulated sectional tool bar, the combination set forth in claim 2, wherein said means for applying torque to the crank arm embodies a draw link having a forward end pivoted to the outer end of the plunger and a rear end pivoted to said crank arm in reentrant fashion relative to the plunger whereby, upon projection of the plunger, the draw link will function in tension to swing the crank arm for wing section raising purposes.

4. In an articulated sectional tool bar, the combination set forth in claim 3, wherein the pivotal connection between the draw link and plunger is normally disposed below the level of the pivotal connection between the draw link and crank arm, whereby the draw link normally assumes a forwardly and downwardly inclined position, and an abutment on the crank arm is positioned in the path of movement of the draw link and is engageable by the latter during projection of the plunger for the additional application of camming torque by a leverage action to the crank arm.

5. In an articulated sectional tool bar, the combination set forth in claim 1, wherein said wing section is capable of swinging movement between its normal lowered earth-working position, through said slightly inclined position to an over-center fully raised position under the influence of said plunger whereby the implement is narrowed for transport purposes, said hydraulic cylinder being of the two-stage type having a first stage which includes said positive displacement piston and a second stage which includes a second piston fixedly mounted on the inner end of said plunger, and a second fluid line communicates with the cylinder at a region between said pistons and effective to drive the second piston further forwardly to fully project the plunger and move said wing to its fully raised over-center position.

6. In an articulated sectional tool bar, the combination set forth in claim 5 wherein the internal abutment within the cylinder is in the form of a rearwardly facing annular shoulder.

7. In an articulated sectional tool bar for carrying agricultural earth-working tools, in combination, a normally horizontal hollow tubular section and an outer wing section, an offset hinge connecting said sections in end-to-end relationship for swinging movement of the wing section between a normal lowered earth-working position where such tools as may be carried thereby may follow a rolling terrain, a slightly inclined raised inoperative position for implement turnabout purposes, and a fully raised inoperative over-center parked position for implement transport purposes, a crank arm on said wing section which normally extends into the adjacent open end of the inner section when the sections are in their extended positions, a two-stage hydraulic cylinder pivotally mounted within the inner section and having a normally retracted plunger, means pivotally connecting the outer end of said crank arm to the plunger whereby, upon projection of the plunger, torque will be applied to the crank arm to swing it forwardly and out of the inner section for wing raising purposes, a first stage positive displacement floating piston disposed in said cylinder, an abutment within said cylinder engageable with said floating piston to limit the extent of forward movement of the latter, a second stage piston disposed in said cylinder forwardly of the first stage piston and fixedly mounted on the inner end of said plunger, said first stage piston being effectively engageable with said plunger during forward movement of the former to transmit its limited motion to the plunger to shift the wing section to its slightly inclined raised inoperative position, a fluid line communicating with the cylinder rearwardly of said floating piston and effective when pressurized to drive the same forwardly against said abutment and thus bring the wing to its slightly inclined raised inoperative position, and a second fluid line communicating with the cylinder at a region between said pistons and effective when pressurized to drive the second stage piston further forwardly to fully project said plunger and thus raise the wing to its over-center position.

8. In an articulated sectional tool bar, the combination set forth in claim 7, wherein said abutment which limits the forward movement of the first stage floating piston is in the form of an internal rearwardly facing annular shoulder which is engageable by said latter piston when the latter is moved to its forward position.

9. In an articulated sectional tool bar, the combination set forth in claim 7, wherein said means pivotally connecting the outer end of said crank arm to the plunger includes a draw link having a forward end pivoted to the outer end of the plunger and a rear end pivoted to said crank arm, and wherein the pivotal connection between the draw link and plunger is normally disposed below the level of the pivotal connection between the draw link and crank arm, whereby the draw link assumes a forwardly and downwardly inclined position, and a lift abutment on the crank arm is positioned in the path of movement of the draw link and is engageable by the latter during initial projection of the plunger under the influence of the first stage piston for the application of additional torque to the crank arm.

10. In an articulated sectional tool bar, the combination set forth in claim 9, wherein a suspension link is pivoted at its proximate end to the plunger and is provided with an elongated slot therein, and a guide pin is mounted on the crank arm, projects through the slot, and is engageable with the distal end of the latter when the plunger is in substantially its fully projected position under the influence of the second stage cylinder, thereby placing the suspension link under tension and supporting the plunger and its associated cylinder in an elevated position.

11. An agricultural implement embodying an elongated transversely extending tool bar carrying earth-working tools thereon along its substantial length, said tool bar including a main section and at least one outboard wing section, a hinge pivotally connecting said wing section to the main section for swinging movement between a lowered extended operative earthworking position, through a raised slightly inclined extended inoperative position for implement turnabout purposes, and a fully raised inoperative position for implement transport purposes, a crank arm on said wing section, a two-stage hydraulic cylinder pivotally mounted on the main section and having a normally retracted plunger, means effective between the outer end of the plunger and said crank arm for applying torque to the latter to thereby raise said wing section progressively during outward projection of the plunger, a first stage positive displacement floating piston disposed in said cylinder, an abutment within the cylinder engageable with said piston to limit the extent of forward movement of the latter, a second stage piston disposed within the cylinder forwardly of said first stage piston and mounted on the inner end of said plunger, said first stage piston being effectively engageable with said plunger during forward movement of the former to transmit its limited motion to the plunger to shift the wing section to its raised slightly inclined extended position, a first fluid line communicating with the cylinder rearwardly of the first stage piston and effective to drive the same forwardly against said abutment and thus bring the wing to its raised slightly inclined extended position, a second fluid line communicating with the cylinder at a region between said pistons and effective to drive the second stage piston further forwardly to fully project said plunger and thus raise the wing section to its fully raised position, at least one ground-engaging assist wheel mounted on said main tool bar section for vertical movement relative thereto, an hydraulic cylinder effective to shift said assist wheel vertically, a third fluid line communicating with said assist wheel cylinder, a pump for selectively supplying fluid to said fluid lines, and control valve means effective in one condition thereof to supply fluid from said pump to said first and third lines exclusive of said second fluid line, said control valve being effective in another condition thereof to supply fluid from said pump to said second fluid lines.

12. An agricultural implement as set forth in claim 11, including additionally, an elongated marker arm pivotally connected at its proximate end to the outer end of said at least one wing section, a marker proper on the distal end of said marker arm, a hydraulic marker cylinder effective between said wing and marker arm for shifting the marker arm between extended and retracted positions, a fourth fluid line extending between said hydraulic marker cylinder and said control valve, a marker shut-off control valve interposed in said fourth fluid line, and said fourth fluid line being pressurized at said control valve when said control valve is in said another condition.

13. An agricultural implement as set forth in claim 12, wherein said marker control valve is spring biased to its shut-off position.

* * * * *